June 17, 1941.  W. T. REA  2,246,064
ELECTRICAL CONTACT PROTECTION
Filed Feb. 12, 1938  5 Sheets-Sheet 1

INVENTOR
W. T. REA
BY
J. W. Schmidt
ATTORNEY

June 17, 1941.  W. T. REA  2,246,064
ELECTRICAL CONTACT PROTECTION
Filed Feb. 12, 1938  5 Sheets-Sheet 2

INVENTOR
W. T. REA
BY
J. W. Schmied
ATTORNEY

June 17, 1941.                W. T. REA                2,246,064
                      ELECTRICAL CONTACT PROTECTION
                          Filed Feb. 12, 1938         5 Sheets-Sheet 3
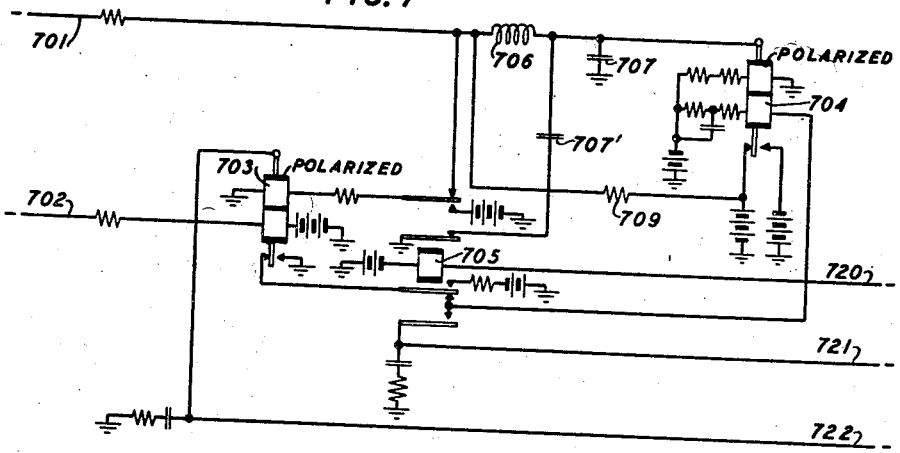
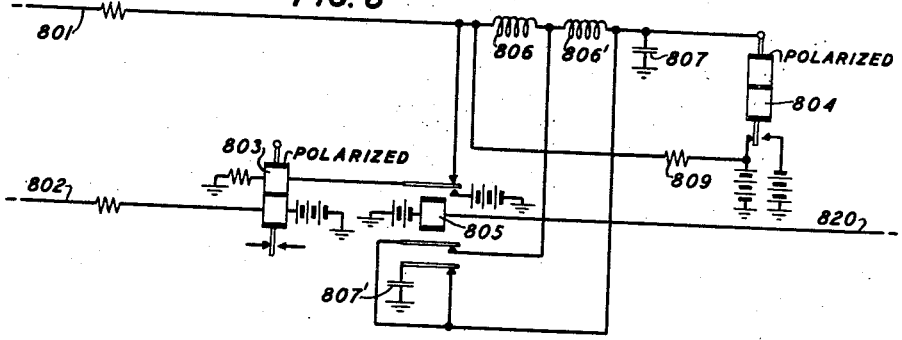
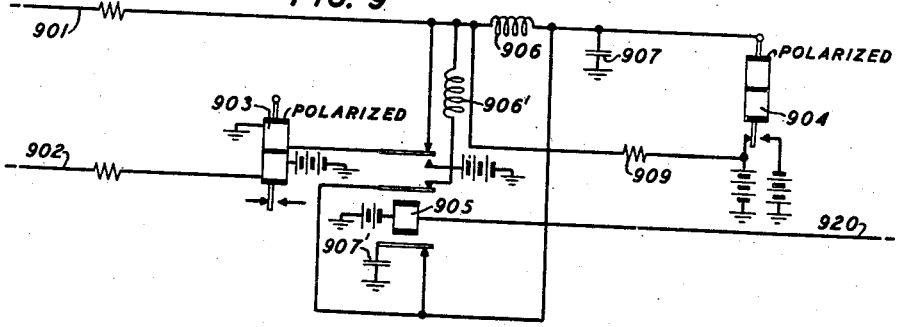
INVENTOR
W. T. REA
BY
J. W. Schmied
ATTORNEY June 17, 1941.    W. T. REA    2,246,064
ELECTRICAL CONTACT PROTECTION
Filed Feb. 12, 1938    5 Sheets-Sheet 4

INVENTOR
W. T. REA
BY
J. W. Schmidt
ATTORNEY

June 17, 1941.                    W. T. REA                    2,246,064
                        ELECTRICAL CONTACT PROTECTION
                           Filed Feb. 12, 1938            5 Sheets-Sheet 5

INVENTOR
W. T. REA
BY
J. W. Schmied
ATTORNEY

Patented June 17, 1941

2,246,064

UNITED STATES PATENT OFFICE 2,246,064

ELECTRICAL CONTACT PROTECTION

Wilton T. Rea, Flushing, N. Y., assignor to Bell Telephone Laboratories, Incorporated, New York, N. Y., a corporation of New York Application February 12, 1938, Serial No. 190,176

20 Claims. (Cl. 175—294)

This invention relates to improvements in the protection of electrical contacts. More particularly it concerns improvements in the resonant circuit contact protective device or, as it is otherwise known, the tuned retard coil contact protective device. The improved device is shown herein as applied to the protection of telegraph relay contacts but may be applied to the protection of any contacts operating in an electrical circuit. In the operation of the resonant circuit contact protective device, the different potentials impressed on two telegraph relay contacts are matched by a transient voltage generated in the resonant circuit, which comprises an inductive coil and a condenser connected to the armature operating between the contacts. As the armature leaves one contact, the transient voltage developed in the resonant circuit impresses on the armature a potential, matching the contact from which the armature is breaking. The potential difference between armature and contact is maintained below the point at which arcing or sparking occurs, while the armature and contact are separated, and is gradually changed before the armature comes into proximity of the contact with which it is to make, so that the armature potential matches the potential of the making contact. Sparking and arcing, and all of the evils attending the making and breaking of contacts at different potentials are very substantially reduced. The present invention is concerned with improvements in the arrangement of the transient voltage generating apparatus and changes in telegraph circuits to permit the more widespread use of the improved device.

Heretofore the resonant circuit protecting device in its application to telegraph circuits has been applied only to telegraph loop circuits in which the current flowing between the armature and either contact of the telegraph relay transmitting into the loop has been equalized. In the invention herein, means are disclosed for applying the protecting device to telegraph loop circuits in which the current flowing between armature and either contact of the telegraph relay, transmitting into the loop, need not be equalized. Further, in the invention herein, means are disclosed for making possible the use of the protective device on other types of telegraph circuits, including polarential telegraph circuits and hybrid repeater telegraph circuits. Polarential telegraph circuits are circuits in which transmission is true polar in one direction and differential in the other direction. Reference is made to Patent 2,131,870 to W. Cramer, October 4, 1938, in which such circuits are described.

As heretofore applied to telegraph loop circuits, the contact protective device has been arranged in either of two manners. In the first manner, the induction coil is shunted by a single condenser. As a result of this, it is found that while contact protection is afforded, undesirable frequencies, developed in the contacts as they make and break, are passed by the tuning condenser into the telegraph loop, introducing noise into associated circuits. In the second manner, the tuning condenser is divided into two units. Each unit is connected in series with a resistance. The condenser in series with the resistance is shunted around the armature and each contact. This method is effective to afford protection and to suppress objectionable frequencies, but four apparatus units, namely two resistances and two condensers are required, in addition to the induction coil, to provide the protection.

In the present invention, as applied to loop and polarential circuits, the tuning capacitance consists of a single condenser only for each pair of relay contacts and armature to be protected. The single condenser is connected between the induction coil and relay armature to ground or to any point where the potential remains constant. Connected in this manner the tuning condenser serves also as a filter to suppress the transmission of the objectionable frequencies to the connected telegraph line.

It is an object of this invention to provide improved contact protection for telegraph relays, using fewer apparatus units than in the heretofore known arrangement of the resonant circuit protective device.

It is a further object of this invention to make possible a more widespread use of the improved resonant circuit contact protective device.

A feature of this invention is that the capacitance used to tune the induction coil, in generating the timed transient voltage, for loop and polarential circuits, is a single condenser which performs the additional function of filtering objectionable frequencies developed in the protected contacts as they make and break.

A further feature of this invention is the modification of telegraph circuits, in which the current passing between the armature and each of the two contacts of a telegraph relay is not balanced, so that the resonant circuit device may be used to provide contact protection therein.

A further feature of this invention is the use of a rectifying device shunting the contact protection induction coil to obtain a greater armature potential change from the armature free steady state potential when the armature swings in one direction, than when it swings in the opposite direction to care for conditions where the free potential of the armature differs widely from the average potential impressed on the two contacts with which it engages.

A further feature of this invention consists in the variation of either the inductance or capacity or both, used in the resonant circuit device, to care for the operation of the protected relay under different operating conditions.

These and other features of the invention will be understood from reference to the accompanying drawings in which Fig. 1 shows a subscriber's telegraph loop circuit including the new contact protection arrangement. In this particular loop circuit the armature current has been balanced for the marking and spacing condition. The resonant circuit protection device comprises the inductance 7, and the single condenser 8, which also serves as a filter to ground for objectionable frequencies developed when armature 6 makes contact alternately with contacts 4 and 5.

Figure 2:
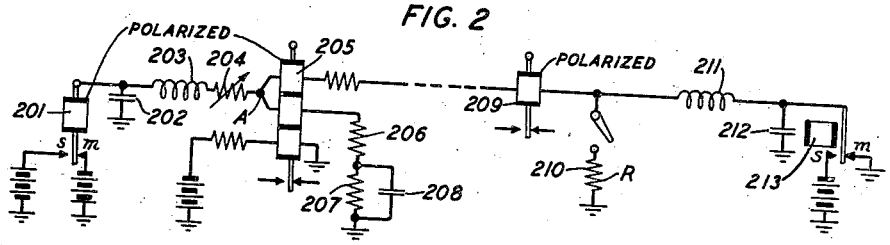
Fig. 2 is another embodiment of the invention in which the resonant circuit contact protecting device, with the single condenser serving the function of tuning the inductance and filtering objectionable frequencies, has been applied to a polarential telegraph circuit.
Figure 3:
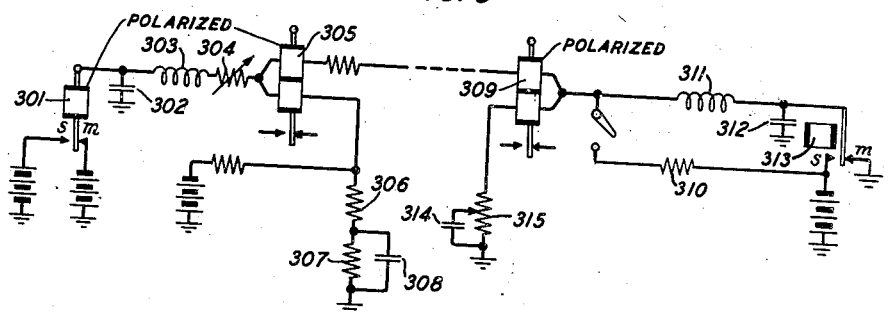
Fig. 3 shows the application of the invention to a polarential telegraph circuit arranged in a slightly different manner from that shown in Fig. 2.

Both Fig. 2 and Fig. 3 are of the same general type of polarential telegraph circuit. Reference to these figures discloses that positive and negative 130-volt battery is applied for the spacing and marking conditions respectively, in transmitting from the left-hand station of the figures, whereas negative 130-volt battery and ground is applied for the spacing and marking conditions respectively, in transmitting from the right-hand stations.

Figure 4:
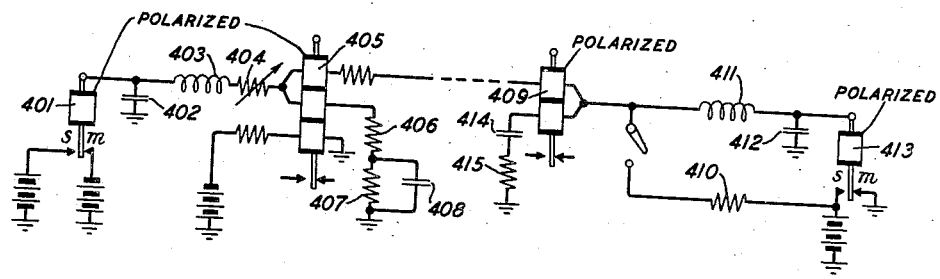

Fig. 4 is a second general type of polarential telegraph circuit to which the invention herein has been applied. It will be observed that this type of circuit differs from that shown in Figs. 2 and 3, from a transmission standpoint, in that the battery polarity of the spacing contact at the right-hand station is positive and with the armature at the left-hand station on the marking contact the batteries at the two stations are in series.

Figure 5:
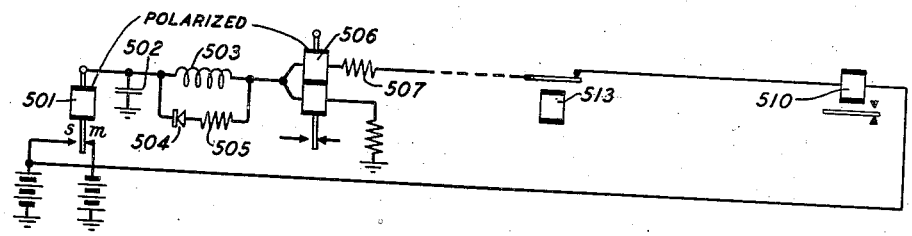

Fig. 5 shows a telegraph loop circuit, in which the current flowing between the armature and each contact of the transmitting relay 501 is not balanced, to which the new contact protection arrangement has been applied. A rectifying device 504 in series with a resistance 505 is shunted around the inductance of the contact protecting device to provide a greater armature voltage swing above the armature free steady state voltage as the armature swings from spacing to marking than when it swings in the opposite direction.

Figure 6:
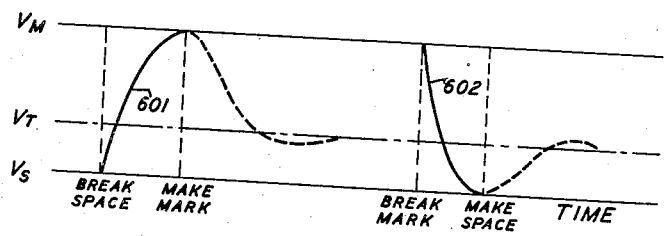
Figure 10:
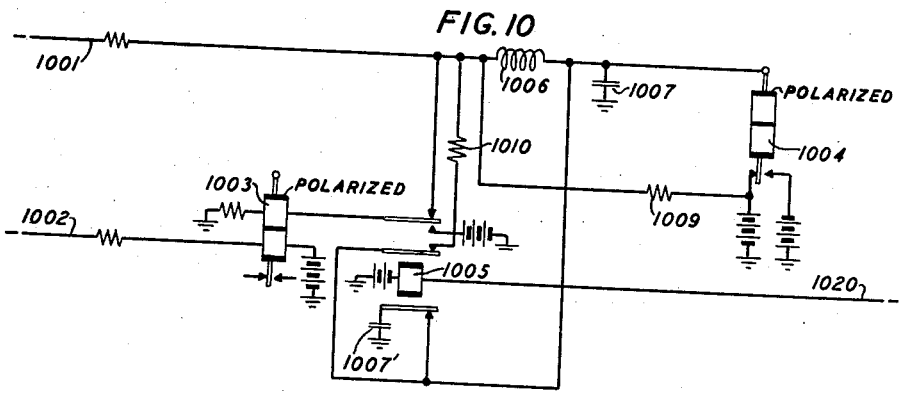
Figure 11:
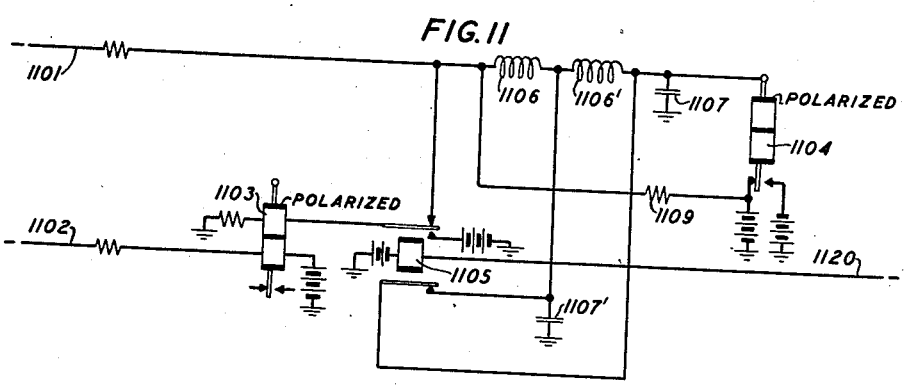
Figure 12:
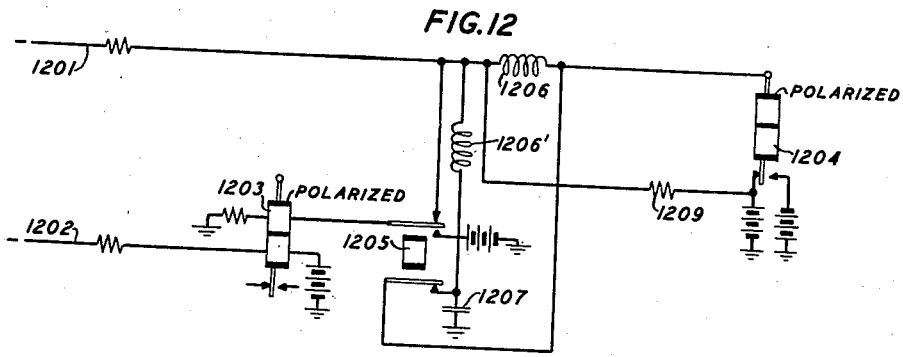
Figure 13:
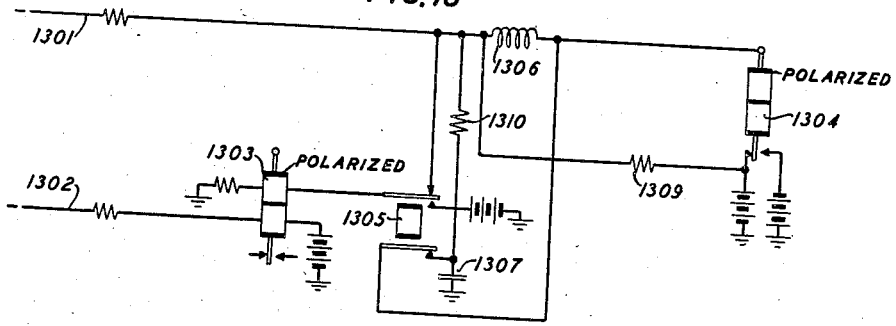
Figure 14:
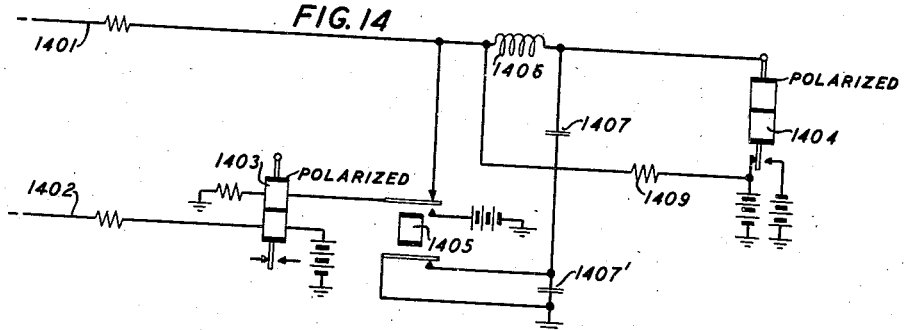

Fig. 6 shows two curves in which armature voltage for relay 501 armature of Fig. 5 is plotted against time. Curve 601 shows the armature voltage change as the armature swings from the spacing to the marking contact. Curve 602 shows the armature voltage change as the armature swings from marking to the spacing contact.

Fig. 7 shows the application of the new contact protective device to a hybrid repeater. In this repeater the telegraph relay operates under two different conditions. In order to afford protection, therefore, it is necessary that the protective device be changed. This is accomplished by a switching relay.

Figs. 8 to 14 inclusive, show variations in the switching arrangement to change the inductance of the coil or the capacitance of the condenser or both in the circuit of the hybrid repeater of Fig. 7.

Figure 15:
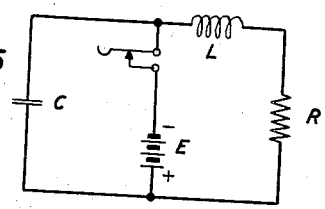

Fig. 15 is a simplified circuit used in connection with an exposition of the underlying theory of the resonant circuit contact protection device.

Figure 16:
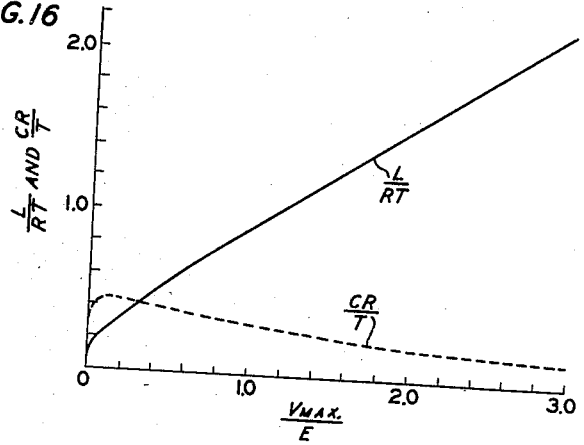

Fig. 16 is a curve showing the relationship between the inductance, resistance and capacitance of the circuit of Fig. 15 and the magnitude and time of occurrence of the initial peak of the oscillatory transient generated by the opening of the key.

Figure 1:
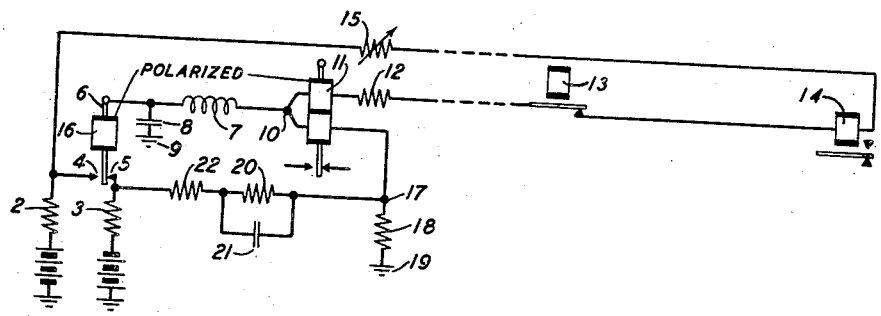

Refer now to Fig. 1. A subscriber's telegraph loop circuit is shown to which the improved resonant circuit contact protecting and filtering device, consisting of induction coil 7 and condenser 8 connected to ground 9, has been applied. In this circuit the current flowing between the armature 6 of relay 16, and each of the relay contacts 4 and 5 has been equalized. The positive and negative batteries connected to contacts 4 and 5 respectively, are equal in magnitude. The various resistances and the resistance of the loop circuit are such that the free potential of armature 6 is zero which is midway between the potential of the two oppositely poled batteries connected to the contacts. The travel times of the relay from contact to contact are equal. The transmitting relay 16 at the central station operates its armature 6 alternately to contacts 4 and 5 under the influence of its relay windings which are not shown. Receiving relay 14 in the loop at the subscriber's station follows these signals. The transmitting relay 13, also at the subscriber's station, opens and closes the loop when transmitting under the influence of its winding not shown, to operate the receiving relay 11 at the central station. When the armature 6 is on contact 5 a circuit may be traced from negative battery through resistance 3, contact 5, armature 6 of relay 16, induction coil 7 to junction point 10 where it divides. One branch follows the lower or biasing winding of relay 11, resistance 18 to ground 19. The other branch follows the upper winding 19 of relay 11, resistance 12, the lower loop conductor, indicated by the lower dotted line, armature and contact of relay 13, relay 14 winding, the upper loop conductor, indicated by the upper dotted line, variable resistance 15, and resistance 2 to positive battery.

The resistance of the loop relative to the resistance of the branch through the lower winding of relay 11 is so arranged that when the armature is in the above-mentioned position namely on contact 5, the current in the loop is approximately 60 milliamperes while the current through the lower winding of relay 11 is 30 milliamperes.

The aggregate current through coil 7, therefore, is 90 milliamperes.

When relay 16, armature 6 has been operated to contact 4, a path may be traced, from positive battery, through resistance 2, contact 4, armature 6 of relay 16, induction coil 7, lower winding of relay 11, to terminal 17 where it branches. One branch follows resistance 18 to ground 19. The second branch follows resistance 20, resistance 22 and resistance 3 to negative battery. The resistance of the path consisting of relay 16 armature 6, through coil 7 to junction point 10 is so low relative to the parallel path comprising the subscriber's loop, that the loop is substantially short-circuited. The current through the upper winding of relay 11 is negligible and the current through the lower winding is 90 milliamperes, all of which flows through coil 7 in the opposite direction from that in which it flows when armature 6 was on contact 5.

A condenser 8 is connected from a point between coil 7 and armature 6 to ground 9.

When the armature 6 breaks from either contact 4 or 5 a transient oscillatory voltage is developed in the inductance coil 7, and condenser 8 which is impressed on armature 6. By a proper choice of constants of the inductance 7 and the capacitance 8, relative to the armature travel time, the change in armature voltage may be so controlled that it matches the voltage of the contacts 4 and 5 alternately as it makes with each. Further, on break, while the armature is in proximity with the contact from which it is separating, due to the shape of the armature voltage-time characteristic curve, the difference in voltage between the armature and the contact from which it is breaking may be maintained small enough to prevent contact troubles.

It has been found that when armature 6 engages contacts 4 and 5, undesirable frequencies, which cause noise in associated circuits, are generated. With the tuning condenser 8 connected in parallel with the inductance 7, as heretofore arranged, when a single tuning condenser was used, the network comprising the inductance and capacity passes these frequencies into the circuit beyond, introducing noise into associated circuits. When, however, the condenser 8 is connected to ground 9 as shown in Fig. 1, the objectionable frequencies are prevented from passing, as the inductance alone in series with the loop circuit presents a high impedance to the frequencies involved. The protective function of the resonant circuit device, however, is unimpaired, because it obviously will generate a transient voltage, the characteristics of which are dependent on the values of the inductance and the capacity and which can, therefore, be controlled to impress the required instantaneous matching voltage on the armature at the proper instant.

In Fig. 1, since the current flowing through the coil 7 is the same in magnitude for each contact position, and since the free voltage of the armature is midway between the voltage of the contacts, the armature voltage-time characteristic for the two conditions will be such that the magnitude of the transient voltage peaks will be the same and occur at the same interval after break in each instance. Since the direction of the current is opposite for the two armature positions, the first peak of each curve will be opposite in direction from the other. Since the inductance of the coil opposes the change in magnitude of the current, the voltage impressed on the condenser and on the armature, when the armature breaks from the negative contact 5 and the current through the coil is decreasing, will be in a direction to maintain the flow of current in the direction in which it is flowing when the circuit is broken. We may consider, therefore, that a new source of voltage is introduced into the circuit across the induction coil, with its poles so arranged that it is in series with the two batteries in circuit just before the circuit is broken. It would be necessary for this condition that the voltage at point 10 be negative and at the other end of the coil, where the condenser and armature are connected, be positive. Therefore, the sign of the armature potential of the first peak after the armature breaks from the negative contact 5 will be positive, matching the sign of the voltage on contact 4 which it is approaching. When the armature breaks from the positive contact 4, the sign of the first peak of the potential on armature 6 will be negative, matching the sign of the voltage on contact 5.

If the armature after breaking were to stand free between the contacts, a voltage would be impressed on the armature oscillating about its free potential. We have seen that the free potential of the armature is midway between the potentials of the contacts which in this case is ground potential. A series of constantly diminishing voltage peaks, alternately opposite in direction, would be impressed on the armature, until the effect of the transient developed in the coil and its tuning condenser were spent, when the armature voltage would be its free voltage, in this case ground potential. If the armature were to make with a contact at some instant while the transient were oscillating, its voltage and the voltage difference between the armature and the contact would depend on the value of the transient voltage at the particular instant. It is possible to control the transient voltage, to fix its peaks in magnitude and time by a proper choice of constants of the inductance coil and the condenser. It is, therefore, possible to impress on the armature a potential equal in magnitude to that of the contact it approaches at an interval after break equal to the armature travel time.

Following is a demonstration of the means of determining the proper values of inductance and capacity for the coil and tuning condenser with relation to the armature travel time and the resistance of the connecting circuit.

The tuned retard contact protective network of a telegraph repeater reduced to its simplest form may be presented by the diagram of Fig. 15. In Fig. 15, E and R are known. It is desired to determine values of L and C such that, when the contact is opened, the initial peak of the oscillatory transient voltage across C will occur at time T and will have the value $+V_{max}$.

The general equation for the relation between charge and time in such a circuit is:

$$q = \alpha_1 e^{p_1 t} + \alpha_2 e^{p_2 t} \qquad (1)$$

where $$p_1 = -\frac{R}{2L} + \sqrt{\frac{R^2}{4L^2} - \frac{1}{LC}} \qquad (2)$$

$$p_2 = -\frac{R}{2L} - \sqrt{\frac{R^2}{4L^2} - \frac{1}{LC}} \qquad (3)$$

and $\alpha_1$ and $\alpha_2$ are constants to be determined from the known initial and final conditions of the circuit. These conditions are I When $t=0 \quad q=-EC$ II When $t=0 \quad i=\dfrac{dq}{dt}=\dfrac{E}{R}$ From condition I $\alpha_1+\alpha_2=-EC$ From condition II $p_1\alpha_1+p_2\alpha_2=\dfrac{E}{R}$ Hence $\alpha_1=-EC\dfrac{\sqrt{\dfrac{R^2}{4L^2}-\dfrac{1}{LC}}+\dfrac{R}{2L}-\dfrac{1}{RC}}{2\sqrt{\dfrac{R^2}{4L^2}-\dfrac{1}{LC}}}$ (4)

and $\alpha_2=-EC\dfrac{\sqrt{\dfrac{R^2}{4L^2}-\dfrac{1}{LC}}-\dfrac{R}{2L}+\dfrac{1}{RC}}{2\sqrt{\dfrac{R^2}{4L^2}-\dfrac{1}{LC}}}$ (5)

Substituting (2), (3), (4) and (5) in (1)

$$q=-ECe^{-\frac{R}{2L}t}\left[\dfrac{e^{\sqrt{\frac{R^2}{4L^2}-\frac{1}{LC}}t}+e^{-\sqrt{\frac{R^2}{4L^2}-\frac{1}{LC}}t}}{2}+\dfrac{\frac{R}{2L}-\frac{1}{RC}}{\sqrt{\frac{R^2}{4L^2}-\frac{1}{LC}}}\dfrac{e^{\sqrt{\frac{R^2}{4L^2}-\frac{1}{LC}}t}-e^{-\sqrt{\frac{R^2}{4L^2}-\frac{1}{LC}}t}}{2}\right]$$

$$=-ECe^{-\frac{R}{2L}t}\left[\cos\sqrt{\dfrac{1}{LC}-\dfrac{R^2}{4L^2}}t+\dfrac{\frac{R}{2L}-\frac{1}{RC}}{\sqrt{\frac{1}{LC}-\frac{R^2}{4L^2}}}\sin\sqrt{\dfrac{1}{LC}-\dfrac{R^2}{4L^2}}t\right]$$

$$V=\dfrac{q}{c}=-Ee^{-\frac{R}{2L}t}\left[\cos\sqrt{\dfrac{1}{LC}-\dfrac{R^2}{4L^2}}t+\dfrac{\frac{R}{2L}-\frac{1}{RC}}{\sqrt{\frac{1}{LC}-\frac{R^2}{4L^2}}}\sin\sqrt{\dfrac{1}{LC}-\dfrac{R^2}{4L^2}}t\right] \quad (6)$$

$$\dfrac{dV}{dt}=Ee^{-\frac{R}{2L}t}\left[\dfrac{1}{RC}\cos\sqrt{\dfrac{1}{LC}-\dfrac{R^2}{4L^2}}t+\dfrac{1}{2LC\sqrt{\frac{1}{LC}-\frac{R^2}{4L^2}}}\sin\sqrt{\dfrac{1}{LC}-\dfrac{R^2}{4L^2}}t\right]$$

When $$V=V_{max}\,\dfrac{dV}{dt}=0\text{ and }t=T$$

then $$\dfrac{\sin\sqrt{\frac{1}{LC}-\frac{R^2}{4L^2}}T}{2LC\sqrt{\frac{1}{LC}-\frac{R^2}{4L^2}}}=-\dfrac{\cos\sqrt{\frac{1}{LC}-\frac{R^2}{4L^2}}T}{RC}$$

or $$\tan\sqrt{\dfrac{1}{LC}-\dfrac{R^2}{4L^2}}T=-\dfrac{2L}{R}\sqrt{\dfrac{1}{LC}-\dfrac{R^2}{4L^2}}$$

$$\sin\sqrt{\dfrac{1}{LC}-\dfrac{R^2}{4L^2}}T=\sqrt{LC}\sqrt{\dfrac{1}{LC}-\dfrac{R^2}{4L^2}} \quad (7)$$

$$\cos\sqrt{\dfrac{1}{LC}-\dfrac{R^2}{4L^2}}T=-\dfrac{R}{2L}\sqrt{LC} \quad (8)$$

substituting (7) and (8) in (6)

$$V_{max}=\dfrac{Ee^{-\frac{RT}{2L}}}{R}\sqrt{\dfrac{L}{C}}$$

or $$C=\dfrac{E^2Le^{-\frac{RT}{L}}}{V_{max}^2R^2} \quad (9)$$

Substituting (9) in (8)

$$\cos\dfrac{RT}{L}\sqrt{\dfrac{V_{max}^2}{E^2}e^{\frac{RT}{L}}-\dfrac{1}{4}}=-\dfrac{Ee^{-\frac{RT}{2L}}}{2V_{max}} \quad (10)$$

For the case in which $V_{max}=E$ $$2\cos\dfrac{RT}{L}\sqrt{e^{\frac{RT}{L}}-\dfrac{1}{4}}=-e^{-\frac{RT}{2L}}$$

From which it is found that $L=.8981RT$. Substituting this value in (9) we get $$C=.295\dfrac{T}{R}$$

It will be seen that Equation 10, though in transcendental form, is a complete single-valued expression for the relation between $$\dfrac{RT}{L}\text{ and }\dfrac{V_{max}}{E}$$

For very large values of $$\dfrac{V_{max}}{E},\dfrac{RT}{L}\text{ approaches }\dfrac{\pi E}{2V_{max}}$$

while for very small values of $$\dfrac{V_{max}}{E},\dfrac{RT}{L}\text{ approaches }2\log_e\dfrac{E}{2V_{max}}$$

Fig. 16 shows computed values of $$\dfrac{L}{RT}\text{ and }\dfrac{CR}{T}$$

for values of $$\dfrac{V_{max}}{E}$$

from zero to 3.

In the telegraph loop circuit of Fig. 1 considered above, to which the resonant circuit contact protective and filtering device was applied, it was not necessary to modify the circuit so that the free potential of the armature to which the device was connected would be centered between the potentials impressed upon the two contacts with which the armature engaged alternately. We will now show how the resonant circuit contact protective and filtering device may be applied to telegraph circuits in which the free potential of the armature of the protected telegraph relay is not centered between the potentials impressed on the contacts.

Fig. 2 and Fig. 3 show modified telegraph circuits of one of the types known as polarential. In polarential circuits the transmission is true polar in one direction and differential in the other. In this particular type of polarential circuit, known in the art as type A polarential, transmission of a spacing signal in the differential direction is accomplished by removing ground from the line and applying to it battery of the same polarity and magnitude as that on the marking contact at the distant station. The advantage of this method of transmission over that of differential systems is that, providing the apex resistance at one station is properly adjusted, variations in line resistance have no effect on telegraph transmission. The theory of why this is so will not be discussed herein, as polarential telegraph systems, per se, are not a part of this invention, and we are concerned now only with the application of a contact protecting and filtering device to the transmitting relays and a modification of the circuit, through the addition of a resistance in each of Figs. 2 and 3, to make it feasible to apply the device at the differential transmitting end.

A description of the operation of Fig. 2 necessary to an understanding of the operation of the contact protection device follows.

Relay 201 is the transmitting relay and relay 205 the receiving relay at a station on one end of the telegraph line. Relay 205 is balanced with respect to relay 201 and does not follow relay 201. Relay 213 is the transmitting relay and relay 209 the receiving relay at a station at the other end of the telegraph line. Relay 209 is not balanced with respect to relay 213 and follows relay 213. Signals may be transmitted from either end to the other but in only one direction at a time. When either station is idle, the relay armature of the transmitting relay at said station is held on its marking contact under the influence of an operating winding, not shown, on each transmitting relay 201 and 213. When either station transmits a spacing signal to the other the armature at the transmitting station is actuated to its spacing contact under the influence of a biasing winding, not shown, on each of the same relays and restored alternately to its marking contact thereafter by the operating winding. The receiving relay 205 has three windings, namely, a line winding which is the top winding, a balancing winding which is the middle winding, and a biasing winding, which is the bottom winding. The resistance of the line, from the apex of relay 205, through relay 205 top winding, the line resistance, relay 209 winding and induction coil 211 to the ground on the marking contact of relay 213, is balanced by the resistance of the circuit from the same apex through the middle winding of relay 205, resistance 206, resistance 207 to ground. The resistance 204 is equal to each of these resistances.

In the case of relay 201 the batteries on the marking and spacing contacts respectively are of equal magnitude and opposite polarity. Since the armature of relay 213 is held on its marking contact, to which ground is connected, while relay 201 is operated, the free potential of the armature of relay 201 is ground potential. The current through coil 203 when the armature of relay 201 is on its M contact is equal and opposite to the current flowing through coil 203 when the same armature is on its S contact. The turned retard contact protecting device, induction coil 203 and condenser 202, may, therefore, be applied to protect the contacts of relay 201 without the necessity of modifying the circuit to center the armature voltage between that of the contacts.

At relay 213 the free potential of the armature as it swings between its contacts, if resistance 210 were disconnected, would be equal to the potential of the apex A of relay 205. This potential is equal to one-half of the potential impressed on the marking contact of relay 201, as the apex is the mid-resistance point of the circuit from the marking contact to ground through the balancing winding of relay 205.

In the theory of operation of a polarential system of this type, the batteries connected to the marking and spacing contact of the polar transmitting relay, relay 201 in this instance, should be made equal and opposite. The battery on the spacing contact at the differential end, relay 213 in this instance, should be the same in magnitude and sign as that on the marking contact at the polar transmitting end, so as to negative the effect of variations in line resistance. If this were the case, the free potential of the armature of relay 213 would be midway between that of its marking and spacing contact and modification of the circuit would be unnecessary. In practice it has been found advisable to partially sacrifice the advantage afforded by this type of circuit to insure better transmission, as the effects of variation in line resistance are usually very small compared with the distortion which may be experienced when insufficient voltage is applied to the line circuit. In practice, resistance 204 is so adjusted that the voltage at the apex A is greater than one-half the voltage of the batteries. The free potential of the armature at the differential transmitting end, relay 213, is no longer equal to one-half of the voltage on the spacing contact of relay 213, but is higher than one-half the difference between ground potential on the marking contact and the potential on the spacing contact at the differential end, relay 213. In order to bring the free armature potential at relay 213, therefore, to the midpoint between ground on its marking contact and the voltage on its spacing contact, resistance 210 is connected into the circuit by means of the switch shown in Fig. 2. The current flowing through the coil 211 when the armature of relay 213 is on its M contact is equal and opposite to the current flowing through the coil 211 when the armature of relay 213 is on its S contact. The constants of the induction coils and condensers are so fixed in relation to the travel times of the relays and the circuit resistance as to match the potentials of the armatures and their engaging contacts in accordance with the mathematical demonstration above.

In Fig. 3 apparatus corresponding in function to that in Fig. 2 is numbered 100 greater than in Fig. 2. As heretofore explained, Fig. 3 is known in the art as a type A polarential telegraph circuit. In Fig. 3 relay 309 is balanced with respect to relay 313 and does not follow it. The free potential of the armature of relay 313 is centered with respect to its M and S contact by means of resistance 310 connected into the circuit by means of the switch indicated. Resistance 310, as shown, is connected from a point between the apex of relay 309 and coil 311 to the spacing contact. The current through the coil is equal and opposite when relay 313 armature is on each of its contacts and again the constants for the coils and tuning condensers may be chosen for the particular relay travel times and circuit resistances involved based on the above mathematical formulas.

The circuit shown in Fig. 4 is known in the art as a type B polarential circuit. Here apparatus performing the same general function as the apparatus in Fig. 2 is numbered 200 greater than in Fig. 2. The potential on the spacing contact at the differential transmitting end, relay 413, is of opposite polarity from that on the marking contact at the polar transmitting end, relay 401. Type B polarential circuits have the advantage of eliminating the effect, on transmission, of changes in line leakage resistance. In this invention we are applying the tuned retard contact protection device to circuits of the type B polarential type and modifying the differential transmitting relay end of the circuit to make the application feasible.

The resistance 410 connected as shown is designed to perform the same function as resistance 310 in Fig. 3 described above, namely, to center the free potential of the armature of relay 413 between that of its two contacts and make the current through the coil 411 equal and opposite when the armature is on each of its contacts so as to fix the constants of the coil and tuning condenser in accordance with the above formulas to obtain the required contact matching potentials on the armature at the proper instant.

Fig. 5 shows a telegraph loop circuit to which another modified form of resonant circuit contact protection and filtering device has been applied. In this circuit the free steady state potential of the armature is not centered between that of its engaging contacts. The effective inductance of the induction coil is changed for the alternate operations of the armature so as to give a greater matching peak for an armature swing in one direction than for a swing in the opposite direction. Reference to Fig. 5 and the following description will disclose how this is accomplished.

Relay 501 is the transmitting relay and relay 506 the receiving relay at the central station connected by the loop to the receiving relay 508 at the subscriber's local station. Relay 510 is the transmitting relay at the subscriber's station. The receiving relay 506 is balanced with respect to the transmitting relay 501 and does not follow signals from 501. The positive and negative batteries on the S and M contacts of relay 501 are equal. The resistance of the circuit from the apex of relay 506 around the subscriber's loop is equal to the resistance from the same apex to ground through the lower winding of relay 506. The steady state potential of the apex when the armature is free is, therefore, one-half of the positive voltage on the S contact. This is also the free steady state voltage of the armature. To match the potential of the S contact, therefore, the armature voltage must be increased over its free steady state voltage 100 per cent in the positive direction. To match the potential of the M contact the armature must be changed 300 per cent in the negative direction from its free steady state voltage.

In order to accomplish this, the effective inductance of the coil 503 is changed for the two conditions. A varistor 504 in series with a resistance 505 is used to shunt the inductance 503. Advantage is taken of the characteristic of a varistor that it offers very much greater resistance to the flow of current in one direction than to the flow of current in the opposite direction. When the armature of relay 501 is on its marking contact, current will flow from positive battery on the S contact around the loop through the coil 503 toward the M contact. The varistor is connected so that for this direction of current flow it affords a low resistance shunt in series with resistance 505 to the inductance coil 503. The effective inductance of coil 503 will be low.

In conjunction with the condenser 502 it will swing the voltage of relay 501 armature 100 per cent above its free steady state condition during the armature travel time to match the potential of the S contact on make. When the armature of relay 501 is on its S contact, the direction of flow of current is from positive battery on this contact through coil 503, through the lower winding of relay 506 to ground. It will be observed that when the armature of relay 501 is on its S contact, the current flows in the opposite direction from that in which it flows when the armature is on its M contact. The resistance offered by the varistor to the flow of current while the armature is on its S contact is very high. The resistance of the shunt around the inductance coil 503 is so high that most of the current passes through the coil 503. The transient voltage developed in it for this condition is such, that in conjunction with condenser 502, its first peak swings the armature voltage 300 per cent from the armature free steady state condition in the negative direction to match the potential on the M contact. With the condenser connected to ground in this, as in all other figures, objectionable frequencies developed in the contacts as they make are filtered out of the connecting loop circuit.

In Fig. 6 armature voltages are plotted against time for the armature voltage of relay 501 of Fig. 5. Curve 601 shows the armature voltage change for an S to M armature transition. In this case the effective inductance of coil 503 is large and the armature voltage change above the free steady state armature voltage level represented by $V_T$ is three times as great as for the transition from M to S represented by curve 602 when the effective inductance of coil 503 is small.

Figs. 7 to 14, inclusive, show a telegraph repeater known in the art as a hybrid repeater which has been modified to apply the resonant circuit contact protection and filtering device to the transmitting relay. The hybrid repeater functions at different times with two different types of connecting circuits. With one type the current flowing through the contact protective induction coil is considerably greater than with the other type. To care for this variation arrangements are disclosed in these figures to vary the capacity of the tuning condenser or the inductance of the coil or both, by means of a relay which is operated or released to change the inductance or capacity or both for the two different types of connections.

Reference to Fig. 7 and the following description will disclose how this is accomplished. The hybrid repeater shown in Fig. 7 functions with either a half duplex loop repeater or a full duplex loop repeater connected to it at the right, and terminal repeaters connected to it at the left. The connecting circuits are not shown as they are not necessary to an understanding of the invention herein. The hybrid repeater as shown in Fig. 7 with relay 705 in its unoperated position is in a condition for connection to a half duplex repeater through conductor 722. Over conductor 722 negative 48 volts is connected for the marking condition and ground for the spacing condition. Conductors 720 and 721 are open. Conductor 701 is connected through the line winding of a relay of the connecting terminal repeater, not shown, to negative 130 volt battery. Conductor 702 is connected through the armature of a relay also in the connecting terminal repeater, not shown, to negative 130 volt battery on the M contact. On the S contact of the same relay is positive 130 volt battery. The hybrid repeater per Fig. 7 as shown is in the marking condition. When signals are being transmitted from the half duplex repeater, relay 703 remains on its marking contact as shown and relay 704 follows the signals. Current of 90 milliamperes flows in opposite directions through the induction coil 706 as the armature of relay 704 engages its marking and spacing contacts alternately. Tuning condenser 707 is permanently connected in circuit as shown. With relay 705 in its unoperated condition, as shown, tuning condenser 707' is also connected into the circuit so that the capacity available to tune the circuit is the sum of condensers 707 and 707'. Resistance 709 serves to center the free steady state voltage of the armature of relay 704 between its marking and spacing potentials.

When the hybrid repeater is connected to a full duplex loop repeater, conductor 720 is connected to ground to operate relay 705. Conductors 721 and 722 are connected to the armatures of relays in the full duplex loop repeater, not shown. On the marking contact of these relays is negative 48 volt battery. On the spacing contacts is ground. Conductor 701 is connected to positive 130 volt battery through the winding of a relay in the terminal repeater, not shown, and conductor 702 is connected to the armature of a relay also in the terminal repeater, on the marking contact of which is negative 130 volt battery and on the spacing contact of which is positive 130 volt battery. With relay 705 operated the hybrid repeater will be in the marking condition for operation with the full duplex repeater.

When the loop repeater transmits to the hybrid repeater, the alternate ground and negative 48 volt connection to lead 721 will operate relay 704 armature alternately to its spacing and marking contacts, connecting positive and negative 130 volt battery to the armature. Under these conditions current of 60 milliamperes flows through the coil in opposite directions, as relay 704 armature engages its marking and spacing contacts. Again resistance 709 functions to center the free steady state voltage but since the current through the induction coil 706 is less, the peak voltages developed in the coil will be less than for the condition when 90 milliamperes of current flowed through it. When relay 705 operated, however, condenser 707' was disconnected from ground and it is not effective in the circuit.

According to the mathematical demonstration above, it is shown that in order to match the potential of a contact with the first peak of the potential on the armature, the inductance of the coil should be .898 RT henries and the capacity of the condenser should be .295 T/R farads where R is the resistance of the circuit and T the time of occurrence of the first voltage peak. As the circuit resistance is increased the inductance required is increased and the capacity required is decreased. The decrease in value of the current through the coil for the full duplex condition over that for the half duplex condition may be considered as due to an increase in the resistance of the oscillating circuit. If we assume that the constants of the inductance and condenser are chosen based on the half duplex condition of greater current flow, to obtain the same matching peak voltage at the same time for the full duplex condition it would be necessary to increase the inductance and decrease the capacity. In practice it has been found that a close approximation may be obtained by varying the capacity alone. When the resistance is raised 50 per cent the peak voltage may be brought back to its original value by halving the capacity and although the frequency of the oscillation is thereby reduced, the voltage match at the time of make is still sufficiently close to prevent damage to the contacts.

In the circuit of Fig. 7, therefore, relay 705 is in the unoperated position when connected to a half duplex repeater when the current through coil 706 is 90 milliamperes. Both condensers, which are of the same capacity, are connected into the circuit for this condition. The constants of the coil 706 and the aggregate capacity of the two condensers 707 and 707' are chosen for this condition. When Fig. 7 is connected to a full duplex repeater and the current through the coil is 60 milliamperes, relay 705 is operated. Condenser 707' is disconnected, halving the capacity while the inductance is unchanged. The peak voltages are approximately the same. The period of the transient is not exactly correct for the second condition but the results in practice have been found to be satisfactory.

Figs. 8 to 14, inclusive, show other embodiments of Fig. 7 in which the inductance, the capacity or both are changed. Where both are changed, of course, the required armature voltage peaks and their times of occurrence can be accurately matched for each condition. In these figures apparatus corresponding to that in Fig. 7 is similarly numbered except that as in the case of Fig. 7 it is preceded by the figure number in each instance.

What is claimed is:

1. A first electrode, a second electrode conditioned to engage with and disengage from said first electrode, and an electrode protecting device connected to said electrodes consisting of elements for impressing a transient voltage on said first electrode of a specific value at specific times, namely at the instants of said engagement and said disengagement, to match a steady voltage impressed on said second electrode, said device consisting of an induction coil and a single capacitative means, said capacitative means directly to ground.

2. In a constant protecting device, a first contact, a second contact separated from said first contact, means for actuating said second contact to engage said first contact, an electric potential of a first value impressed on said first contact, an electric potential of a value different from said first value impressed on said second contact and a transient voltage generating device including an induction coil in series with said second contact and a condenser connected from said second contact to ground, conditioned to change the potential of said second contact to reduce the difference in potential between said first contact and said second contact as said contacts engage.

3. In a contact protecting device, a first electrical contact, a second electrical contat in electrical engagement with said first contact, means for actuating said second contact to disengage from said first contact, an electric potential of a first value impressed on said contacts, while said contacts are in engagement, an electric potential of a second value different from said first value impressed on said second contact after said contacts have disengaged and a transient voltage generating device including an inductive coil connected in series with said second contact and a tuning condenser connected from said second contact directly to a point of fixed potential, said means operating to reduce the difference between said potentials for an interval as said contacts disengage.

4. In an electrical circuit, a relay, a first electrode on said relay, a second electrode on said relay, an armature on said relay making contact alternately with said first electrode and said second electrode, a first electric potential impressed on said first electrode, a second electric potential impressed on said second electrode, a third electric potential of a value different from said first potential and from said second potential impressed on said armature, a transient voltage generating device connected to said circuit comprising an induction coil in series with said armature and a condenser connected directly between said armature and a point of fixed potential, cooperating to match the potentials of said armature and said electrodes as they make alternately and to prevent the entrance into said circuit of objectionable frequencies generated on said armature as said contacts make.

5. In a relay contact protecting device, a relay, a contact, an armature conditioned to engage said contact, a potential of a first value impressed on said contact, a fixed potential of a different value from said first value impressed on said armature when said armature is not in engagement with said contact and a transient voltage generating device, connected to said relay, for matching the potential of said contact with an instantaneous value of the transient voltage as said armature engages said contact, said device comprising means for suppressing currents of objectionable frequencies generated as said armature and said contact make.

6. In a telegraph circuit, a transmitting relay, a first contact on said relay, a second contact on said relay, an armature on said relay, said armature conditioned to make with and break from said contacts alternately, a first potential impressed on said first contact, a second potential impressed on said second contact, a third potential impressed on said armature of a value different from said first potential and from said second potential and a transient voltage generating device connected to said armature consisting of an induction coil in series with said armature and a single capacitative means connected from said armature to a point of fixed coil potential, the electrical constants of said coil and said condenser being so chosen as to reduce the difference between said potentials on said contacts and said armature as said armature makes and breaks with said contacts.

7. In a telegraph circuit, a telegraph transmitting relay, a first contact on said relay, a first electric potential impressed on said contact, a second contact on said relay, a second electric potential, different from said first potential, impressed on said second contact, an armature on said relay conditioned to make with and break from each of said contacts alternately, a third potential impressed on said armature when said armature is not in engagement with either of said contacts, said third potential being substantially closer in value to said first potential than to said second potential and means in said circuit for impressing on said armature a potential alternately matching that on said first contact and said second contact as said armature makes and breaks with each of said contacts.

8. In a telegraph circuit, a telegraph transmitting relay, a first contact on said relay, a first electric potential impressed on said contact, a second contact on said relay, a second electric potential impressed on said second contact, different from said first potential, an armature on said relay conditioned to make and break from each of said contacts alternately, a third electric potential impressed on said armature when said armature is not in engagement with either of said contacts, said third electric potential being substantially closer in value to said first potential than to said second potential and means in said circuit, consisting of an induction coil and a unidirectional current shunt for said coil, for impressing on said armature a potential alternately matching that on said first contact and said second contact as said armature makes and breaks with each of said contacts.

9. A first electrode, a second electrode, a first potential impressed on said first electrode, a second potential different from said first potential, impressed on said second electrode, an armature contacting said electrodes alternately, a third potential different from either of said potentials, impressed on said armature when said armature is not in contact with either of said electrodes, said third potential being substantially different than the mid-potential between said first potential and said second potential, and electric apparatus means for impressing on said armature potentials alternately matching said first potential on said first electrode and said second potential on said second electrode as said armature alternately contacts each.

10. A first electrode, a second electrode, a first potential impressed on said first electrode, a second potential, different from said first potential, impressed on said second electrode, an armature contacting said electrodes alternately, a third potential different from either of said potentials, impressed on said armature when said armature is not in contact with either of said electrodes, said third potential being substantially different than the mid-potential between said first potential and said second potential, an induction coil in series with said armature, a unidirectional current shunt consisting of a varistor in series with a resistance connected in parallel with said coil, and a condenser, connected from said armature directly to a point of fixed potential, for impressing on said armature potentials alternately matching said first potential on said first electrode and said second potential on said second electrode as said armature alternately contacts each.

11. In a contact protecting device a relay, a contact on said relay, a first potential impressed on said contact, an armature on said relay, a second potential different from said first potential impressed on said armature when said armature is not in engagement with said contact, means for operating said armature to engage with and disengage from said contact, a current of a first magnitude flowing through said armature and said contact at a first time, a current of a substantially greater magnitude flowing through said armature and said contact at a second time, and variable contact protection means comprising an induction coil and a plurality of condensers conditioned to generate transient voltages of different magnitudes to protect said contact at the two said times.

12. A device for protecting contacts in an electric circuit, means in said device for generating an oscillating voltage, a first and a second lumped inductance unit and a first and a second lumped capacitance unit in said means, and means also in said device for automatically varying the number of said units connected effectively in said device to protect said contacts when different loads are connected to said contacts at different times.

13. A telegraph relay, a first and second contact and an armature all on said relay, a first and second electric potential impressed on said first and second contacts and a third electric potential impressed on said armature when said armature is not in engagement with said contacts, respectively, a substantial difference in magnitude between said third potential and the mid-potential between said first and second potentials, respectively, means connected to said relay for changing said third potential in magnitude to the mid-point between said first and second potentials, and a contact protection device with a single condenser connected directly to a point of fixed potential.

14. A first electrode, a second electrode, an armature contacting said electrodes alternately, a first potential impressed on said first electrode, a second potential impressed on said second electrode, a third potential impressed on said armature when said armature is not in contact with said electrodes, means for centering said third potential to the mid-point in magnitude between said first and second potentials, and a resonant contact protecting device comprising a single condenser connected directly to a point of fixed potential for changing the potential impressed on said armature to match the potentials impressed on said electrodes as said armature contacts each alternately.

15. In an electrical circuit, a first electrode, a second electrode spaced therefrom, means associated with said circuit for closing said second electrode through said space to contact said first electrode in time T seconds, a battery having a first pole connected to said first electrode and a second pole connected in series to the first end of a conductor having a resistance R, an electrode protecting device comprising an inductance of L henries connected in series between said second electrode and the second end of said conductor, and a condenser of capacity C microfarads shunting said electrodes and connected to said second pole of said battery, the constants of said elements being related in the proportions $$C = .295 \frac{I}{R}$$

and $L = .8981\ RT$.

16. In an electrical circuit, a first contact, a second contact, an armature conditioned to make with and break from each of said contacts, a first potential difference impressed between said first contact and said armature when said armature is disconnected from said contacts, a second potential difference, substantially greater than said first difference, impressed between said second contact and said armature when said armature is disconnected from said contacts, a contact protection device, comprising an inductance coil and a tuning condenser therefor, connected to said armature, said device being conditioned to protect said armature and said first contact as they disengage and automatic means comprising a rectifier shunting said inductance for changing the protection afforded by said device to protect said armature and said second contact as they disengage.

17. In an electrical circuit, a first contact, a second contact, an armature conditioned to make with and break from each of said contacts, a first potential difference impressed between said first contact and said armature when said armature is disconnected from said contacts, a second potential difference substantially greater than said first difference impressed between said second contact and said armature, when said armature is disconnected from said contacts, a contact protection device, comprising an inductance coil and a tuning condenser therefor, connected to said armature, said device being conditioned to protect said armature and said first contact as they engage and automatic means, comprising a rectifier shunting said inductance, for changing the protection afforded by said device to protect said armature and said second contact as they engage.

18. A pair of cooperating electrical contacts, an electrical load of a first magnitude connected to said contacts at a first time, an electrical load of substantially different magnitude from said first magnitude connected to said contacts at a second time, means for interrupting the transfer of electrical energy to said load through said contacts at said times, so as to generate disruptive arcs of different intensities between said contacts for the two conditions, a contact protection device comprising a lumped inductance and lumped capacity, connected to said contacts, the ratio of said inductance to said capacity being so chosen as to protect said contacts at said first time, and automatic means for changing said ratio to protect said contacts at said second time.

19. In an electric circuit, a pair of electrical contacts each conditioned to engage with and disengage from the other, means for passing a current of a first magnitude through said contacts at a first time, a contact protection device connected to one of said contacts comprising a lumped inductance and a lumped capacitance so proportioned in relation each to the other as to generate a transient electromotive force of such magnitude as to protect said contacts while said contacts are engaging and disengaging, means for passing a current of a second magnitude substantially different from said first magnitude through said contacts at a second time, and relay switching means for changing said proportion to protect said contacts at said second time.

20. In an electrical circuit, a battery, a contact in engagement with an armature, a lumped inductance, and an electrical load all connected in series to form a continuous circuit, a lumped capacitance having a first terminal connected to said armature and a second terminal connected to a point of fixed potential, means for connecting fixed quantities of said inductance and said capacitance effectively in circuit in a first ratio to protect said contacts at a first time and means for changing said ratio to protect said contacts at a second time.

WILTON T. REA.